Dec. 19, 1944.  G. KEITH  2,365,557
MULTIPLE MEANS FOR APPLYING BRAKES
Filed Aug. 6, 1942
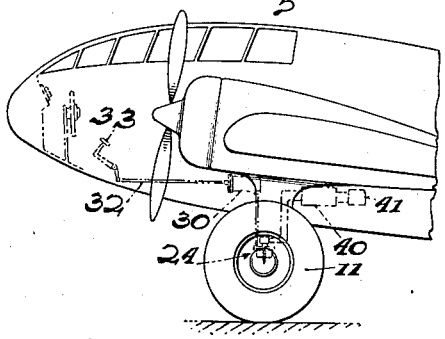
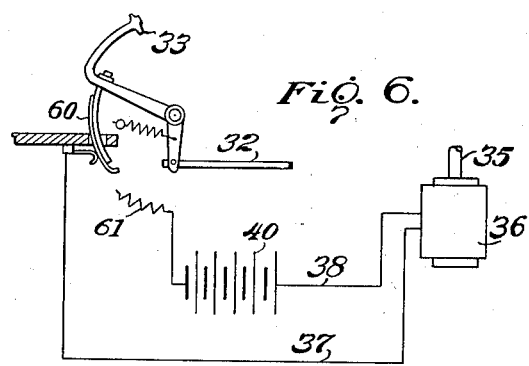
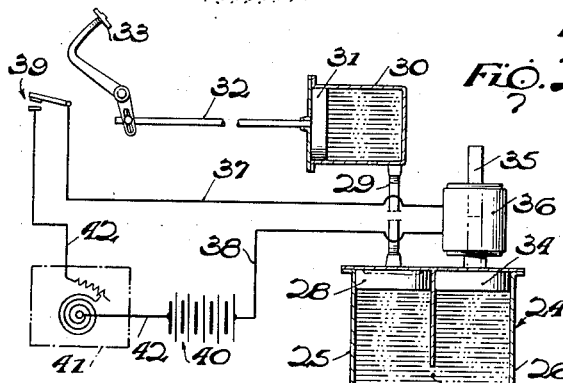
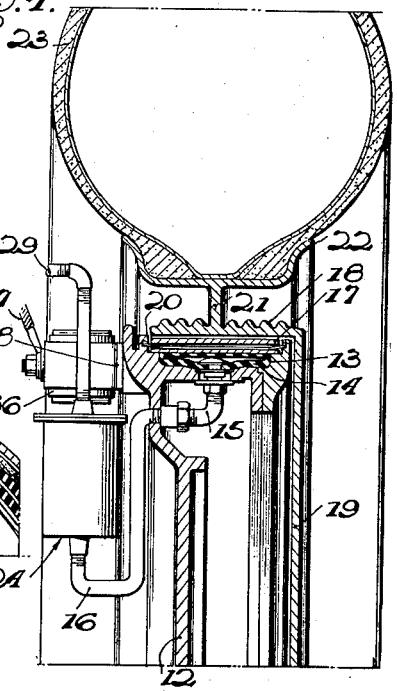
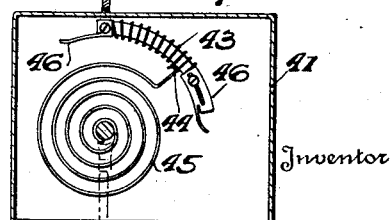
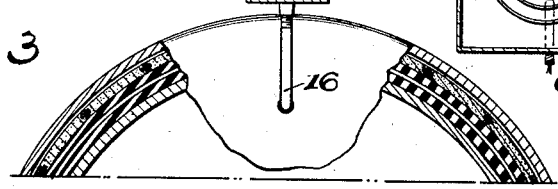
Inventor
Glenn Keith.
Dye + Kirchner
Attorneys Patented Dec. 19, 1944

2,365,557

UNITED STATES PATENT OFFICE 2,365,557

MULTIPLE MEANS FOR APPLYING BRAKES

Glenn Keith, East Detroit, Mich.

Application August 6, 1942, Serial No. 453,869

15 Claims. (Cl. 188—106)

The present invention relates to vehicle braking systems and more particularly to a system including a normal brake applying apparatus combined with an auxiliary brake applying apparatus which will automatically be brought into operation when for any reason the normal apparatus fails.

In the preferred embodiments shown and described in this specification and the accompanying drawing, the system is shown applied to the landing wheels of an aircraft, since this is one type of use to which the invention is admirably adapted, but it is to be understood that the construction is equally applicable to other kinds of vehicles.

In aircraft particularly it is desirable to associate with a normally usable brake applying means an auxiliary means that will automatically go into operation when for any reason the normal means does not operate. It is particularly desirable that no additional effort be required of the pilot to operate the auxiliary means. It is a principal object of the present invention to associate with a normally usable brake applying means an auxiliary mechanism capable of applying the brakes automatically on continued actuation of a single control element for the two means if the brakes should fail to be applied by the normal means.

The system thus combines an emergency mechanism with what may be a more or less conventional service brake mechanism. The principal types of service brake applying mechanisms which are at present preferred by the industry are of the fluid pressure type controlled by a pedal which is actuated to increase pressure in a master cylinder and communicate this pressure to brake cylinders mounted adjacent to the wheels. The master cylinder and the brake cylinders are connected by fluid pressure lines, and it sometimes happens that these lines break or leak. In the case of military aircraft these lines because of their length are quite vulnerable to damage in combat. The brake cylinders themselves occupy relatively small space and are commonly located close to the wheels. For these reasons they are less liable to be damaged.

A further object of the invention is to associate with a normal service brake system an auxiliary or emergency system whose parts are confined wholly to the immediate region of the wheels to be braked, except for electric wire leads connecting with a control element and a battery or other source of current.

The preferred constructions proposed by the present invention include two independent means for applying pressure to the brake cylinders. Both means being successively operable upon continued actuation of a single control element, such as a pedal, brake application is possible as long as one of the means remains intact, and since the two means are quite independent and considerably separated up to the point where they join, which is at the wheel to be braked, it is relatively unlikely that any single cause of damage to one of the means will involve any damage to the other.

In the preferred embodiments the construction includes a fluid pressure force normally applicable to the brake cylinder plunger and an electric motive force alternatively or sequentially acting on the brake cylinder.

In the accompanying drawing, which illustrates certain preferred embodiments of the invention applied to an aircraft equipped with a known type of brake member for each of its braked landing wheels, Figure 1 is a side elevational view of the forward portion of an aircraft;

Fig. 2 is a diagrammatic illustration of one type of system proposed by the invention;

Fig. 3 is a similar view of another type of system proposed by the invention;

Fig. 4 is a radial section through part of a landing wheel equipped with a known type of brake and with either of the embodiments of the present invention shown in Figs. 2 and 3;

Fig. 5 is an elevational view of a preferred type of variable resistance device which may be used in the system; and Fig. 6 is a diagrammatic illustration of a modified circuit arrangement.

Referring now to the drawing, the reference numeral 10 designates a vehicle, here shown as a conventional type of aircraft having a pair of forward landing wheels 11 each provided with any desired kind of brake device, such for example as that shown more in detail in Fig. 4.

This brake device, the specific features of which are known and form no part of the present invention, comprises a stationary torque member or frame 12 having a circular peripheral channel 13, recessed within which is an inflatable expander tube 14 connected by a nipple 15 to a short fluid pressure line 16. The tube 14 is normally collapsed but is adapted to expand, upon receiving fluid pressure through the line 16, against a series of segmental brake shoes 17 to press such shoes against the drum 18 of the wheel 19. Means may be associated with the shoes for keeping them normally retracted from the drum, such means being shown in the illustrated embodiment of the invention in the form of transverse leaf springs 20 which extend through the shoes and seat in openings in the channel 13. An outstanding radial flange 21 extends from the drum and is flared to form a rim 22 for a tire 23.

The present invention provides a chamber 24 located closely adjacent to the torque member 12 and connected to the pressure line 16 for increasing pressure in this line to expand the tube 14 and thus apply the brake.

An important feature of the invention is the provision of two normally independent means for increasing pressure in this chamber, which may be called a brake cylinder. Fig. 2 illustrates one of several forms which these two independent means may take. In this embodiment the chamber is a double cylinder, one cylinder being designated 25 and the other 26. The two cylinders are set closely together side by side and communicate by means of a port 27 near their lower ends.

The cylinder 25 contains a floating plunger 28 which is normally, when the brake shoes are retracted, positioned at the upper end of the cylinder. From the cylinder head a pressure line 29 extends to a cylinder 30 in the fuselage of the aircraft, and this cylinder 30 has a piston 31 carried by a rod 32 which receives rearward thrust from some appropriate control element such as the pedal 33.

With a body of brake fluid filling the cylinder 30 and line 29, and another body of brake fluid filling the cylinder 25 and line 16, it will be obvious that actuation of the control element 33 will cause the floating plunger 28 to descend and increase pressure in the chamber 24 to apply the brake. This is the normal operation of the brake applying means.

In the cylinder 26 of the chamber 24 a plunger 34 is normally positioned in the head end of the cylinder, which end is perforated to pass a rod 35 for the plunger. This rod has its upper portion formed of iron, so that it acts as the armature of a solenoid, the coil 36 of which surrounds the rod 35 and is fixed just above the chamber 24, adjacent to the torque member 12, to which it may be secured as by a bracket 48.

It will be obvious that upon the plunger 28 being driven into its cylinder 25, no fluid will pass through the port 27 and into the cylinder 26 because this cylinder is effectively closed by its plunger 34. It will also be apparent that if the plunger 34 is driven into its cylinder 26, no fluid will pass through the port 27 because the cylinder 25 will be effectively closed by its plunger 28. Thus, if the plunger 34 is driven into the cylinder 26, as by energization of the coil 36, the brake will be applied by the resulting increase of pressure in the chamber 24.

The coil 36 is connected by electric wires 37 and 38 with a switch 39 and a battery or other source of current 40. A variable resistance device 41 may be interposed in this circuit, as by connecting it in a line 42 which connects the battery with the switch.

This variable resistance device may be identical with that disclosed in my copending application Serial No. 452,050, filed July 23, 1942. As more particularly shown in Fig. 5, it includes a stationary resistance winding 43 engaged by a contact 44 carried by the free end of a bimetallic coiled element 45. Shoes 46 on the opposite ends of the resistance winding 43 afford convenient means of calibrating the device to include more or less of its coils. The device is arranged so that the contact 44 is initially engaged with the outer shoe 46 or with a coil of the winding 43, so that a conductive path is established through the device. When the circuit including this path is completed, as by closing the switch 39, the coil 45 expands in response to heating and its contact 44 moves toward the shoe 46 so as progressively to cut out more of the coils of the winding and thus decrease the resistance offered by the device. In this way an initially feeble current builds up to one of greater strength, so that the coil 36 becomes increasingly energized if the switch 39 is closed. It will be observed that this will have the effect of gradually and progressively increasing the braking force applied to the drum 18.

The switch 39 is positioned so as to be engaged and closed by the control element 33 when the latter is actuated further than the initial range which is required to apply the brake by action of piston 31 in cylinder 30. The system may be arranged so that the switch 39 will not be closed by the element 33 unless no sufficient braking effect is produced by movement of the piston 31, in which case the electrical portion of the system will be a purely emergency agency which will not be called on to function if the service agency operates. However, if desired, the switch 39 may be arranged to be closed by the element 33 before that element reaches the end of its stroke necessary to produce full application of the brake, in which case the electrical agency will perform the function of an auxiliary or booster device.

The system shown in Fig. 3 is very similar to that of Fig. 2. It differs principally in that in it the chamber 24 is a single cylinder 50. Like the double cylinders 25 and 26, this cylinder 50 is connected at its bottom to the line 16 and it contains, normally at its head end, a single plunger 51 the rod 52 of which extends out through a supplemental chamber 53 formed on the cylinder head and packed by a gland 54. This rod is, like the rod 35, formed as an armature and is surrounded by a coil 55.

In the Fig. 3 embodiment the pressure line 29 from the cylinder 30 leads into the supplemental chamber 53 so that pressure in the cylinder 30 will act on the rear of the plunger 51 and force it down into the cylinder 50 to cause the brake to be applied. Energization of the coil 55 will similarly thrust the plunger 51 down into the cylinder 50 to cause the brake to be applied. It will be appreciated that the system is operated by the pilot in exactly the same way as the system shown in Fig. 2 and that the two systems embody the same substantial principle.

The Fig. 3 embodiment has the advantage of occupying smaller space and comprising somewhat fewer parts, but the Fig. 2 embodiment has the advantage of dispensing with the packing means required in Fig. 3.

Of course, in any embodiment of the invention the brake devices for each of the brake-equipped wheels are connected in parallel, as by arranging plural lines 29 branching from the cylinder 30 and leading to each chamber 24, and by connecting the coils or the like 36 or 55 in parallel with the circuit including the switch 39, battery or the like 40, and resistance device 41 if such be included.

It is to be understood that no resistance device 41 or its equivalent need be included in the system unless it is desired to prevent sudden, full-power application of the brakes upon closing the auxiliary or emergency circuit. Of course any other means for producing gradual and progressive increase of braking effect may be substituted.

The solenoid devices shown as comprising the electric motive means of the system are illustrative merely, and may be replaced by any other kind of electrically operated or controlled brake-applying means.

In some cases, to suit the preference of some pilots, it is desirable to substitute a rheostatic circuit closer for the simple type of switch shown at 39. Such an arrangement is shown in Fig. 6 where the element which is movable in response to depression of the pedal or the like 33 carries a member 60 which comes into engagement with and wipes the windings of a resistance element 61 so as progressively to increase the value of the current flowing through the circuit including the battery 40 and solenoid 36 as the pedal is further depressed. This of course will eliminate the need of the resistance device 41, since it will enable the pilot to control directly and at will the value of the braking effect. It has the advantage, which is highly regarded by some pilots, of giving the pilot the "feel" of the brakes as they are being applied. That is to say, with such a system the pilot directly feels the effect of electrical application of the brakes as he progressively depresses the pedal, just as he directly feels the effect of mechanical application during the initial movement of the pedal.

It is expected that in each installation of the system shown by the drawing, including the variable resistance device 41 or its equivalent, such device will be accurately calibrated or adjusted to bring the particular vehicle to a stop in the shortest time or running distance possible, or in such time or distance as may be thought best for the particular vehicle. Of course if a rheostatic circuit closer be substituted, stopping time and distance will be a matter for the pilot to decide each time the electrical system is energized.

Other specific embodiments are contemplated but it is believed that the two herein disclosed are sufficient to exemplify the principles of the invention. These principles are regarded as of broad application, and all modifications of the disclosed constructions which embody these principles as defined by the appended claims are to be regarded as within the scope and purview thereof.

I claim:

1. A vehicle braking system comprising a brake member, a fluid pressure chamber connected to the brake member for applying the same, a brake control element, a fluid pressure cylinder connected to said element and to said chamber so that upon initial actuation of the element pressure in the chamber will be increased, an electrical device also connected to the chamber and adapted when energized to increase pressure in the chamber, and a switch adapted to close a circuit including said electrical device and a source of current when the brake control element is further actuated.

2. A vehicle braking system comprising a wheel and a brake member cooperating therewith, a fluid pressure chamber adjacent to the wheel and connected with the brake member to apply the same upon increase of pressure in the chamber, means for increasing pressure in the chamber comprising a fluid cylinder, a fluid line connecting the cylinder to the chamber, and a control element normally initially actuatable to increase pressure in the cylinder for communication to the chamber, and means operable in an emergency, upon further actuation of the control element, for increasing pressure in the chamber independently of the cylinder and line.

3. A vehicle braking system comprising a wheel and a brake member cooperating therewith, a fluid pressure chamber adjacent to the wheel and connected with the brake member to apply the same upon increase of pressure in the chamber, means for increasing pressure in the chamber comprising a fluid cylinder, a fluid line connecting the cylinder to the chamber, and a control element normally initially actuatable to increase pressure in the cylinder for communication to the chamber, and means operable in an emergency, upon further actuation of the control element, for increasing pressure in the chamber, said last named means comprising a plunger in the chamber, an electric device for moving the plunger to increase pressure in the chamber, and a circuit including the electrical device and a switch adapted to be closed upon said further actuation of the control element.

4. In a vehicle wheel braking system, a fluid pressure brake-applying chamber mounted adjacent to the wheel, plunger means in the chamber, a fluid pressure cylinder, a fluid line connecting the cylinder to the chamber, a piston in the cylinder, a control element adapted to drive the piston when the element is initially actuated, a switch adapted to be closed when the element is further actuated, a source of current and an electric motive device in circuit with the switch, and means connecting the electric motive device with said plunger means whereby actuation of the control element operates to increase pressure in the chamber, initially through the medium of the cylinder and line and finally through the medium of the electric motive device.

5. In a vehicle wheel braking system, a fluid pressure brake-applying chamber mounted adjacent to the wheel, a pair of plungers in the chamber, a fluid pressure cylinder, a fluid line connecting the cylinder to the chamber for conducting fluid under pressure from the cylinder to one of the plungers to increase pressure in the chamber, a piston in the cylinder, a control element adapted to drive the piston when the element is initially actuated, and independent electrical means, operable when the element is further actuated, for electrically operating the other plunger in the chamber to increase pressure in the chamber.

6. In a vehicle wheel braking system, a fluid pressure brake-applying chamber mounted adjacent to the wheel, a pair of plungers in the chamber, a fluid pressure cylinder, a fluid line connecting the cylinder to the chamber for conducting fluid under pressure from the cylinder to one of the plungers to increase pressure in the chamber, a piston in the cylinder, a control element adapted to drive the piston when the element is initially actuated, and an electrical circuit including a solenoid connected to the other plunger in the chamber and a switch adapted to be closed to energize the solenoid when the control element is further actuated to operate said other plunger to increase pressure in the chamber.

7. In a vehicle wheel braking system, a fluid pressure brake-applying chamber mounted adjacent to the wheel, a pair of plungers in the chamber, means including a control element for applying fluid pressure to one of the plungers when the element is initially actuated, means including an electric circuit for driving the other plunger, and means for closing said circuit when the element is further actuated.

8. In a vehicle wheel braking system, a fluid pressure brake-applying chamber mounted adjacent to the wheel, a pair of plungers in the chamber, means including a control element for applying fluid pressure to one of the plungers when the element is initially actuated, an armature connected to the other plunger, an electric device for applying force to the armature, and means for energizing the electric device when the control element is further actuated.

9. In a vehicle wheel braking system, a fluid pressure brake-applying chamber mounted adjacent to the wheel, a pair of plungers in the chamber, means for independently applying force to said plungers to compress fluid in the chamber comprising fluid pressure means connected to one of the plungers and means including an electric circuit for driving the other plunger, and a single control element adapted when initially actuated to apply fluid pressure to the first named plunger and adapted when further actuated to close said electric circuit to drive the other plunger.

10. In a vehicle wheel braking system, a fluid pressure brake-applying cylinder mounted adjacent to the wheel, a plunger in said cylinder, a rod connected to the plunger and projecting from the cylinder, means for conducting fluid pressure to the back of the plunger to drive the plunger into the cylinder, electric means operative on the rod to drive the plunger into the cylinder, and a control element adapted when initially actuated to increase pressure in the conducting means and adapted when further actuated to close a circuit to the electric means.

11. In a vehicle wheel braking system, a fluid pressure brake-applying cylinder mounted adjacent to the wheel, a plunger in said cylinder, an armature connected to the plunger and projecting from the cylinder, means for conducting fluid pressure to the back of the plunger to drive the plunger into the cylinder, a solenoid cooperating with the armature to drive the plunger into the cylinder, and a control element adapted when initially actuated to increase pressure in the conducting means and adapted when further actuated to close a circuit to the solenoid.

12. In a vehicle wheel braking system, a fluid pressure brake-applying cylinder mounted adjacent to the wheel, a plunger in said cylinder, an armature connected to the plunger and projecting from the cylinder, means for conducting fluid pressure to the back of the plunger to drive the plunger into the cylinder, a second cylinder connected to the conducting means, a piston in said second cylinder, a solenoid cooperating with the armature to drive the plunger into the brake-applying cylinder, and a control element adapted when initially actuated to drive the piston into the second cylinder and adapted when further actuated to close a circuit to the solenoid.

13. In a wheel braking system, a fluid pressure brake-applying chamber mounted adjacent to the wheel, a plunger in the chamber for increasing the fluid pressure therein, a control element for driving said plunger, and mechanism cooperating with the element and the plunger comprising a fluid pressure transmission device operative to drive the plunger when the element is initially actuated and an electric circuit including an electromotive device, a source of current and a rheostatic circuit closer for progressively increasing the fluid pressure in the chamber after initial actuation of the element.

14. In a wheel braking system, a fluid pressure brake-applying chamber mounted adjacent to the wheel, a single plunger in the chamber for increasing the pressure therein, a control element for said plunger, and mechanism cooperating with the element and the plunger comprising a fluid pressure transmission device operable on the plunger when the element is initially actuated and an electric circuit including an electromotive device connected to the plunger, a source of current and a rheostatic circuit closer for progressively increasing the pressure in the chamber after initial actuation of the element.

15. In a wheel braking system, a fluid pressure brake-applying chamber mounted adjacent to the wheel, a pair of plungers in the chamber adapted to be driven to increase the pressure in the chamber, a control element for said plungers, and mechanism cooperating with the element and the plungers comprising a fluid pressure transmission device operable on one of the plungers when the element is initially actuated and an electric circuit including an electromotive device connected to the other plunger, a source of current and a rheostatic circuit closer for progressively energizing the electromotive device to increase the pressure in the chamber after initial actuation of the element.

GLENN KEITH.